US007971193B2

(12) United States Patent
Li et al.

(10) Patent No.: US 7,971,193 B2
(45) Date of Patent: Jun. 28, 2011

(54) METHODS FOR PERFORMINING CROSS MODULE CONTEXT-SENSITIVE SECURITY ANALYSIS

(75) Inventors: Xinliang David Li, Sunnyvale, CA (US); Suneel Jain, Los Gatos, CA (US); Shinming Liu, Saratoga, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1383 days.

(21) Appl. No.: 11/486,552

(22) Filed: Jul. 14, 2006

(65) Prior Publication Data

US 2008/0016496 A1  Jan. 17, 2008

(51) Int. Cl.
*G06F 9/44* (2006.01)
(52) U.S. Cl. .......................... 717/133; 717/129
(58) Field of Classification Search .................. None
See application file for complete search history.

(56) References Cited

U.S. PATENT DOCUMENTS

| 5,671,419 | A  | * | 9/1997 | Carini et al. ............... 717/145 |
| 6,343,376 | B1 | * | 1/2002 | Saxe et al. ................. 717/154 |
| 6,769,114 | B2 | * | 7/2004 | Leung ........................ 717/124 |
| 7,047,394 | B1 | * | 5/2006 | Van Dyke et al. ........... 712/209 |
| 7,877,737 | B2 | * | 1/2011 | Austin et al. ............... 717/132 |
| 2007/0083933 | A1 | * | 4/2007 | Venkatapathy et al. ...... 726/25 |

OTHER PUBLICATIONS

Vinod Ganapathy et. al.; Buffer Overrun Dectection using Linear Programming and Static Analysis; Oct. 27-31, 2003; ACM; pp. 345-354.*
Gary McGraw, Static Analysis for Security, 2004, Published by the IEEE Computer Society, [online], retrieved on Feb. 4, 2011, pp. 32-35. Retrieved from the Internet <URL:http://www.cigital.com/papers/download/bsi5-static.pdf>.*
Tzi-cker Chjueh and FU-Hau Hsu, RAD: A Compile-Time Solution to Buffer Overflow Attacks, 2001, Published by IEEE, [online], retrieved on Feb. 4, 2011, pp. 409-417. Retrieved from the Internet <URL:http://ieeexplore.ieee.org/stamp/stamp.jsp?tp=&arnumber=918971>.*

* cited by examiner

*Primary Examiner* — Tuan Q Dam
*Assistant Examiner* — Hanh T Bui

(57) ABSTRACT

A computer-implemented method for detecting program bugs in source code of a computer program that includes a plurality of source modules, each of the plurality of source modules including at least a set of subroutines, is provided. The method includes performing summary collection on subroutines of the plurality of source modules. Performing the summary collection includes collecting first data pertaining to at least untrusted data in each of the subroutines of the plurality of source modules. The method also includes storing the first data in a set of intermediate files. The method further includes performing interprocedural analysis on the set of intermediate files. The interprocedural analysis is configured to identify at least first untrusted data in a given subroutine of the subroutines of the plurality of source modules and to map a data flow tracking the first untrusted data across at least two of the plurality of source modules.

19 Claims, 11 Drawing Sheets

Main Subroutine

```
-------xchat1.c-------
#include <sys/socket.h>
extern int getlen();
extern void getdata (int len, char* buf);
Int main()
{
    char buf[100];
    int len= getlen();
    getdata(len, buf);
    copydata(len, buf);
}
```

Getdata Subroutine

```
-------xchat3.c-------
#include <sys/socket.h>
Void getdata (int len, char *buf)
{
    recv(1,buf, len, 0); // Line 4
}
```

Getlen Subroutine

```
-------xchat2.c-------
#include <sys/socket.h>
int getlen()
{
    int buf[10];
    recv(1, buf, 1, 0); //Line 5
    return buf[0] + 2;
}
```

Copydata Subroutine

```
-------xchat4.c-------
#include <sys/socket.h>
void copydata (int len, char* buf);
Int main()
{
    int i;
    for (i=0; i<len; i++) //Line 5
        fub[i] = I;
}
```

FIGURE 3

| Transfer Function | Subroutine |
|---|---|
| 602 — getdata_actual_1 = getlen_return | Main |
| 604 — copydata_actual1 = getlen_return | Main |
| 606 — getlen_formal_return = tainted | Getlen |
| 608 — buf = pointer_to_tainted | Getdata |
| 610 — *buf = tainted | Getdata |
| 612 — len = caller_actual_binding | Getdata |
| 614 — len = call_actual_binding | Copydata |

FIGURE 6

Static Stack Trace 1
"xchat/xchat4.c", line 5, procedure copydata: warning #20114-D: (SECURITY)
Tainted value may be used in loop exit condition computation
++ 'copydata' is called by 'main' at line 15 in file xchat/xchat1.c
++++ tainted value is returned from 'getlen' called by 'main' at line 7 in file xchat/xchat1.c

Static Stack Trace 2
"xchat/xchat3.c", line 4, procedure getdata: warning #20111-D: (SECURITY)
Tainted data may be used in data length computation
++ 'getdata' is called by 'main' at line 11 in file xchat/xchat1.c
++++ tainted value is returned from 'getlen' called by 'main' at line 7 in file xchat/xchat1.c

FIGURE 11

METHODS FOR PERFORMING CROSS MODULE CONTEXT-SENSITIVE SECURITY ANALYSIS

BACKGROUND OF THE INVENTION

In the computer field, a program bug refers to a potential flaw and/or mistake in a computer program that may prevent the computer program from performing as intended. Generally speaking, program bugs may have a variety of impact. In an example, a program bug may cause minor annoyances such as sending an end-user to a defunct web page when the user clicks on a link. A program bug may also cause more serious problems, such as causing an application to freeze or create security flaws such as denial of service attack or system being taken over via buffer overruns and/or endless loops. Further, a program bug may enable a third party program to exploit flaws in the computer program to attack the software and/or hardware of a computer.

Generally, before a computer program may be moved into production, a code review process may be employed to identify program bugs in the computer program. In the prior art, the process of reviewing the code has been mostly a manual process. One method of reviewing the code is to manually review the source code; however, this method may require vast amount of resources, such as time and man-power. Further, the reviewer(s) may not necessarily have the necessary skill set and knowledge to adequately review the source code. Thus, manual code review is usually not an efficient method for performing an in-depth code review.

Another method that may be employed to review the source code may be to employ a scanning-based tool. Generally speaking, a scanning-based tool is a software application that employs an algorithmic approach to scan through the source code to identify potential problems. In an example, a scanning-based tool may scan through the source code looking for source tokens that may map to unsecured application program interface (API). API is well-known to those skilled in the art. Thus, no further discussion will be provided about API.

Although scanning-based tools may identify potential problems, these tools are usually not able to identify the sources of the problems. In an example, a scanning-based tool may be able to identify that line 20 has an error, but the tool may be unable to identify the originating source of the problem. As a result, the tedious task of identifying the originating source of the bug may still exist. Thus, the process of analyzing source code may still require extensive time and man-power that may not always be available, especially during time-crunch situations.

To facilitate discussion, FIG. 1 shows a simple logic diagram of a computer programming development cycle. During a design specification step 102, the requirements for a new computer program may be provided. At a next step 104, the design specification may be reviewed by the security review team to identify any potential program bug that may exist in the overall architecture of the design. At a next step 106, one or more programmers may begin the coding process using the design specification. Upon completing his programming, each programmer may review his source code for any potential problem, at a next step 108. This step may be a manual task that may require each programmer to check his code for potential problems. Since this is usually a labor intensive process, the computer program may not be sufficiently analyzed.

After each programmer has reviewed his code, the programmer may send his code to another programmer to perform peer review, at a next step 110. Besides being reviewed by another programmer, the code may be tested, at a next step 112. Examples of types of tests that may be performed include, but are not limited to, function testing and regression testing. In addition, at a next step 114, scanning-based tools may be employed to review the code for potential problems. Generally, the results from scanning-based tools may include a large amount of data; however, a large portion of these data may not be program bugs but still represent data that requires the programmer to review. As discussed earlier, the results from the scanning-based tools may lack sufficient information that can readily point out the source of the problem. Thus, at a next step 116, the programmers may still have to perform a labor intensive review of the results from the scanning-based tools.

At a next step 118, if program bugs are identified, then the programmers may fix the bug. Steps 108 through step 118 are iterative steps that may be repeated until no additional program bugs are identified. Once no more program bugs are identified, then at a next step 120, stress testing for finding security flaws may be performed. In stress testing, the testers may be performing extreme tests that are meant to severely stress the system. If program bugs are identified during stress testing, then at a next step 122, the program bugs may be fixed and steps 108 through steps 122 may be repeated until no additional program bugs are discovered. Once all program bugs are identified, then the computer program may be released and moved into production, at a next step 124.

As can be appreciated from the foregoing, the traditional computer program development cycle can be quite long and tedious. This is mostly due to the iterative steps 108 through 122, which may be fairly labor intensive. In a competitive market where first-to-market may be critical, a long development cycle is counterproductive.

Further, FIG. 1 shows that a high expertise level of knowledge may be required by the reviewers. Generally, a programmer may have strong knowledge on application development. However, the software field being complex and fast moving, it is difficult for a single person to know all the skill sets related to software development. Accordingly, it is not uncommon to find that many programmers, even skilled programmers who are experts in coding, do not possess detailed and up-to-date knowledge regarding computer security.

In addition, in the development of a large and complex application and particularly one developed in a compressed time frame (as commercial applications often are), individual programmers are assigned to only small portions of the overall project. Thus, it is typically the case that programmers working on a typical commercial software project do not have the overall knowledge of all modules of the project. As such, it is possible for skilled programmers to create modules and functions that are error-free when tested individually but result in program bugs when the individual modules and functions are integrated into the larger application program. As a result, computer programs may be moved into production with unidentified program bugs, creating an open window for potential hackers to create havoc to the system.

SUMMARY OF INVENTION

The invention relates, in an embodiment, to a computer-implemented method for detecting program bugs in source code of a computer program that includes a plurality of source modules, each of the plurality of source modules including at least a set of subroutines. The computer-implemented method includes performing summary collection on subroutines of the plurality of source modules. Performing the summary collection includes collecting first data pertaining to at least untrusted data in each of the subroutines of the plurality of source modules. The computer-implemented method also includes storing the first data in a set of intermediate files. The computer-implemented method further includes performing interprocedural analysis on the set of intermediate files. The interprocedural analysis is configured to identify at least first untrusted data in a given subroutine of the subroutines of the plurality of source modules and to map a data flow tracking the first untrusted data across at least two of the plurality of source modules.

In another embodiment, the invention relates to an article of manufacture comprising a program storage medium having computer readable code embodied therein. The computer readable code is configured to detect program bugs in source code of a computer program that includes a plurality of source modules. Each of the plurality of source modules includes at least a set of subroutines. The article of manufacture includes computer readable code for performing summary collection on subroutines of the plurality of source modules. Performing the summary collection includes collecting first data pertaining to at least untrusted data in each of the subroutines of the plurality of source modules. The article of manufacture also includes computer readable code for storing the first data in a set of intermediate files. The article of manufacture further includes computer readable code for performing interprocedural analysis on the set of intermediate files. The interprocedural analysis is configured to identify at least first untrusted data in a given subroutine of the subroutines of the plurality of source modules and to map a data flow tracking the first untrusted data across at least two of the plurality of source modules.

In yet another embodiment, the invention relates to, in a computer system, a compiler implemented using computer readable code, including computer readable code configured to detect program bugs in source code of a computer program that includes a plurality of source modules, each of the plurality of source modules including at least a set of subroutines. The compiler includes computer readable code for performing summary collection on subroutines of the plurality of source modules. Performing the summary collection includes collecting first data pertaining to at least untrusted data in each of the subroutines of the plurality of source modules. The compiler also includes computer readable code for storing the first data in a set of intermediate files. The compiler further includes computer readable code for performing interprocedural analysis on the set of intermediate files. The interprocedural analysis is configured to identify at least first untrusted data in a given subroutine of the subroutines of the plurality of source modules and to map a data flow tracking the first untrusted data across at least two of the plurality of source modules.

These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3 shows an example of four different subroutines that will be used as running examples to illustrate the summary collection phase and the interprocedural phase.

FIG. 6 shows, in an embodiment, examples of transfer functions. In an embodiment, a transfer function may show the relationship between a leaf node and a reachable node.

FIG. 11 shows, in an embodiment, examples of static stack traces that may be provided.

DETAILED DESCRIPTION OF VARIOUS EMBODIMENTS

Figure 1:
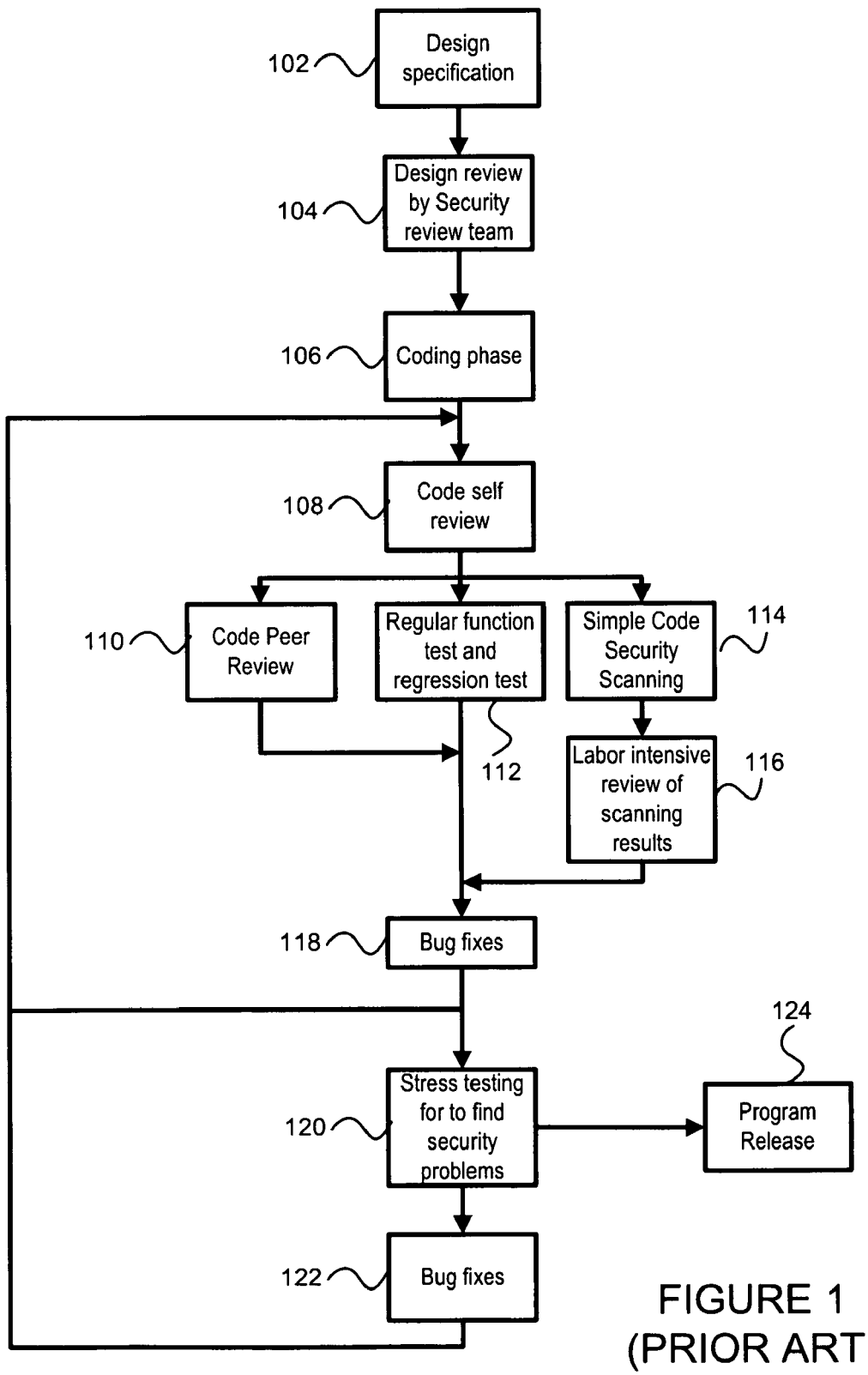
FIG. 1 shows a simple logic diagram of a computer programming development cycle.

The present invention will now be described in detail with reference to various embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described herein below, including methods and techniques. It should be kept in mind that the invention might also cover an article of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out operations pertaining to embodiments of the invention. Examples of such apparatus include a general purpose computer and/or a dedicated computing device when appropriately programmed and may include a combination of a computer/computing device and dedicated/programmable circuits adapted for the various operations pertaining to embodiments of the invention.

In accordance with embodiments of the present invention, there is provided a method for performing cross module context-sensitive security analysis (CMCSSA) on source code. In various embodiments of the invention, the CMCSSA technique may be performed on subroutines (e.g., routines, functions, methods, procedures, etc.) in order to identify program bugs and/or to generate data flow which maps each program bug back to its originating source to enable programmers to efficiently identify the source of the program bug.

Consider the situation wherein, for example, a computer program may include a plurality of source modules. Each source modules may include a plurality of subroutines (also known as functions, routines, or other terminologies denoting subunits of a source module). The CMCSSA technique includes without limitation, in an embodiment, the process of analyzing specific parts of a subroutine in the context of one or more source modules. Examples of specific part of a subroutine that may be analyzed include, but are not limited to, critical references and untrusted data.

As the terminology is employed herein, a critical reference refers to a code function that is critical to the safe execution of a computer program. If a third party is able to hack the value of a critical reference, problems may arise causing severe systemic problems, such as causing the system to be aborted or to be taken over. Examples of critical references include, but are not limited to, target buffer write, loop exit condition, format string, file path read, etc.

As aforementioned, untrusted data may also be a type of potential problem that the CMCSSA application may be programmed to searched for. Generally speaking, untrusted data refers to data that may be provided by an external source. An example of an untrusted data may include data that may be provided by an external end-user. Another example of an untrusted data may be data that may be provided by an external database.

In an embodiment of the invention, the CMCSSA technique may be embedded into a compiler. Thus, as a programmer is working on the computer program, CMCSSA may be performed whenever the compiler is invoked. Although CMCSSA may be performed after the entire project is completed, performing CMCSSA while parts of the program are being created may be more efficient in many cases since data may be collected as the project progresses. In this manner, program bugs may be caught earlier in the development cycle, simplifying the task of integrating modules into the final program at the end of the project.

In an embodiment, the CMCSSA technique involves utilizing a configurable table or database defining various types of potential problems, such as critical references and untrusted data, that the CMCSSA application may be programmed to search for and/or handle. In an embodiment, the problem definitions may leverage on common standards in the programming community as well as on specific knowledge learned over time by different programmers working on a particular software application project. In this manner, bug detection does not depend on the expertise of any single programmer but may leverage on the knowledge of the entire industry as well as on enterprise-level knowledge possessed by different programmers working on the project.

Generally speaking, CMCSSA may be divided into two phases: summary collection phase and interprocedural phase. In the summary collection phase, data about specific parts of a subroutine within a source module may be being collected, in an embodiment. In the interprocedural phase, the data may be compared across modules to create a data flow for each program bug, in an embodiment.

During the summary collection phase, data about critical references and untrusted data for each subroutine may be collected. An assignment graph, which may represent a data structure, may be created for each subroutine. An assignment graph may be employed to represent data/value flow between different variables/locations in the subroutine. In other words, the relationship between the different types of data may be graphically represented to facilitate the summary collection phase.

In addition, transfer functions may be formulated during the summary collection phase. In an embodiment, transfer functions may be created based on the assignment graph for each subroutine. As discussed herein, a transfer function refers to a function that establishes a relationship between two or more data. By applying one or more sequence of transfer functions, relationships between an untrusted data and a critical reference may be established. In other words, a transfer function may be a summary or a way to model the relationship between an untrusted data and a program state (e.g., call side arguments, variables used in the critical references, etc.).

Transfer functions are advantageous in tracking untrusted data through function calls to other subroutines that may have received the untrusted in the interprocedural phase. In other words, with transfer functions, analysis may no longer be limited to a single source module. Instead, with transfer functions, interprocedural analysis may be performed across different modules, in an embodiment. Since most program bugs are not localized to a single source module, the inability of traditional bug detection techniques to adequately analyzes program bugs across modules have greatly limited the type of analysis that may be performed in the prior art. However, with transfer functions, program bugs may now be traced back to their originating source, even if the originating source is disposed in a source module different from the source module where the untrusted data is first detected.

Once the summary collection phase has been completed, the compiler may create an intermediate file to store the data collected for each source module, in an embodiment. The data stored in the intermediate file may later be utilized in the creation of data flows during the interprocedural phase. In an embodiment, the summary data collected during the summary collection phase may be stored in a set of intermediate files. As discussed herein, a set of intermediate files refers to one or more intermediate files.

In another embodiment, the data collected may also be stored in a centralized database to enable additional standalone security analysis to be performed. Since the standalone security analysis is performed on a database that is different from the intermediate files employed during the interprocedural phase, standalone security analysis may be performed in parallel, resulting in faster bug detection.

During the interprocedural phase, the compiler may be merging the data from the various intermediate files, in an embodiment. Data from the intermediate files may be employed to create a call graph. Generally speaking, a call graph refers to a diagrammatic representation of the relationship between the caller (the subroutine that may call another subroutine) and the callee (the subroutine that may be called by another subroutine). A node in a call graph may represent a subroutine. In an example, if a computer program has ten subroutines, then ten nodes may be shown on a call graph. In addition, the call graph may employ edges (diagrammatically represented using, for example, lines with arrows) to illustrate the relationship between the subroutines.

A call graph is advantageously chosen by the inventors herein to illustrate relationships between subroutines since the relationships defined in the call graph may be employed to perform backward and forward propagation for untrusted data during the interprocedural phase. During the backward propagation stage, a subroutine that may be associated with untrusted data (i.e., callee) may be analyzed to determine the prior subroutine that may have called the callee. The calling subroutine from the previous step may then be analyzed to determine the prior subroutine that may have called it. This process may be repeated until all subroutines calling the untrusted data have been analyzed.

In the next stage, forward propagation may occur. During this stage, subroutines that have been analyzed during the backward propagation stage may be analyzed to determine if the subroutines associated with untrusted data may have called other subroutines. Subroutines that are identified during this state are then in turn analyzed. This process may be repeated until all subroutines that may have been called by a potentially tainted subroutine have been analyzed.

With the backward and forward propagations, a complete data flow may be generated for each potential program bug that has been identified. Code reviewers are no longer limited to a terse error warning, which may provide little or no details about the program bug. Instead, in embodiments of the invention, warnings with static stack traces may be issued for each program bug. As discussed herein, a static stack trace may provide information about the origination of the untrusted data, how the untrusted data may have been employed, and the program bug(s) identified.

Figure 2:
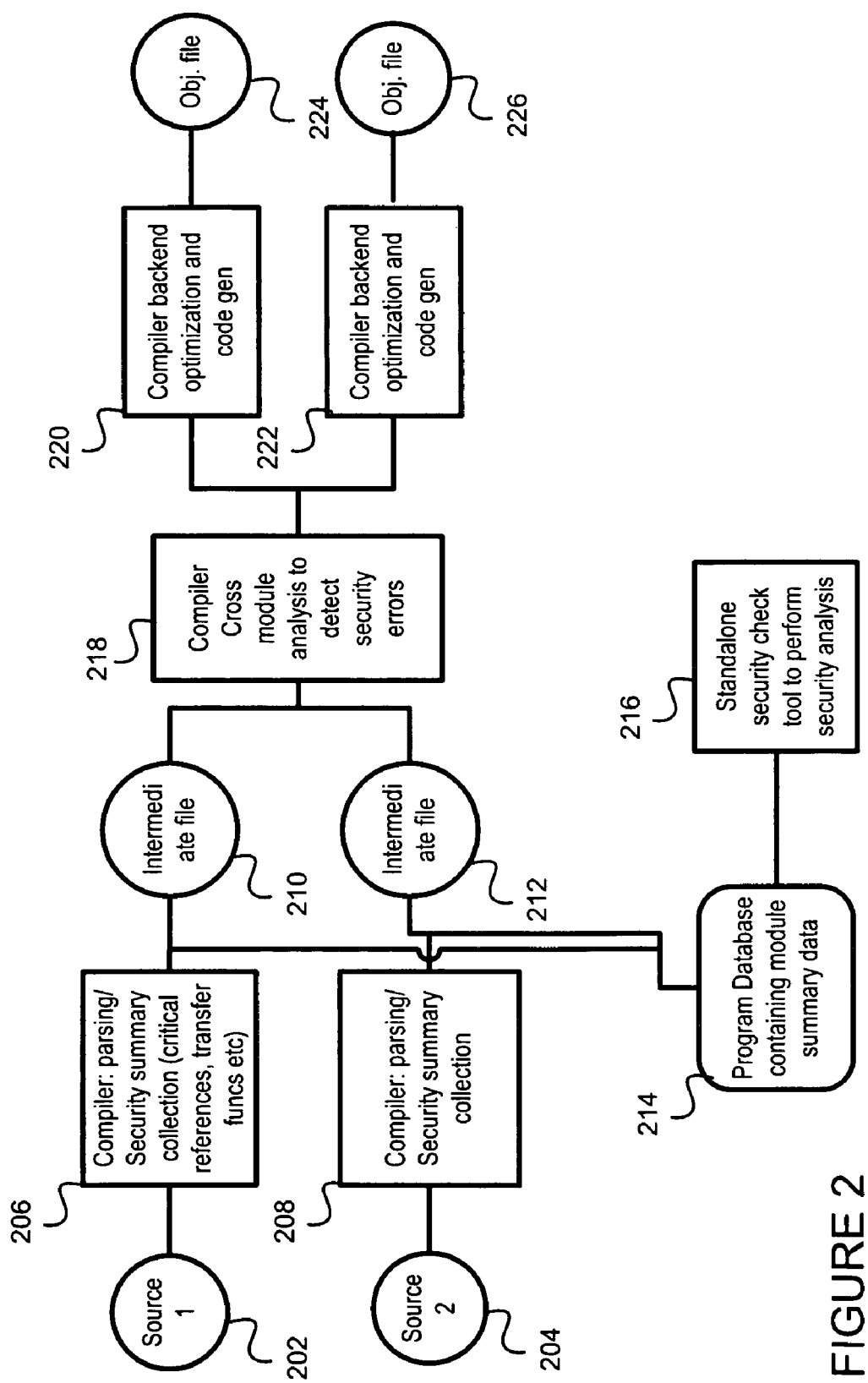
FIG. 2 shows, in an embodiment, a simplified logic diagram illustrating a cross module context-sensitive security analysis (CMCSSA) application embedded within a compiler.

The features and advantages of the invention may be better understood with reference to the figures and discussions that follow. FIG. 2 shows, in an embodiment, a simplified logic diagram illustrating a cross module context-sensitive security analysis (CMCSSA) application embedded within a compiler. Consider the situation wherein, for example, a computer program with a plurality of source modules (202 and 204) is being compiled (block 206 and block 208, respectively) to create object files (224 and 226, respectively).

In an embodiment, the source modules (202 and 204) may be analyzed by the CMCSSA application while the source code is being programmed. In another embodiment, the source modules may be analyzed by the CMCSSA application after the programming has been completed. Generally speaking, however, running the CMCSSA application in parallel with the programming may represent a highly efficient data collection method for the purpose of bug detection.

As mentioned above, the CMCSSA application may include a list of potential problems, such as unsecured API, critical references, and/or untrusted/untainted data that the CMCSSA application may be programmed to search for. The CMCSSA application may be divided, in an embodiment, broadly into two phases: summary collection phase and interprocedural phase. During the summary collection phase, the embedded CMCSSA within the compiler (block 206 or block 208) may unobtrusively collect data about the various subroutines of each source module (202 and 204). Data collected may be included, but is not limited to, critical references and untrusted data. Further, an assignment graph may be generated illustrating the data structure for each subroutine. In addition, one or more transfer functions may be formulated based on the assignment graph for each subroutine to define a relationship between program variables, function call argument, and other subroutine elements.

Unlike a traditional compiler, the compiler with an embedded CMCSSA may first create intermediate files (210 and 212) before generating object files (224 and 226). Each intermediate file may include, but is not limited to, results of the program, intermediate representation (e.g., data structure that include the input data into a computer program), and initial analysis of the summary results of the program (e.g., critical reference, transfer function, untrusted data, etc.). The data stored in the intermediate files (210 and 212) may later be utilized in the creation of data flow during the interprocedural phase.

In another embodiment, the data collected may also be stored in a centralized database (block 214). Additional standalone security analysis (block 216) may be performed on the data collected in block 214 during the summary collection phase without interfering with the compiler performing interprocedural analysis on intermediate files 210 and 212 during the interprocedural phase.

Once the intermediate files have been created, the compiler may perform cross module analysis (218), in an embodiment. In other words, data from the various intermediate files (210 and 212) may be merged and compared at the interprocedural phase to create a data flow for each untrusted data identified. In an embodiment, not all intermediate files need to be analyzed during the interprocedural phase. However, a more complete analysis may be performed if all intermediate files are included.

In an example, a table of global symbols (variables and functions) and how they are employed in the various subroutines may be created. In addition, a call graph may be created showing the relationship between the caller (the subroutine that may call another subroutine) and the callee (the subroutine that may be called by another subroutine). Once the global structures have been established, different analysis may be performed to identify program bugs. In an embodiment, data flows may be created to map program bugs back to their originating sources.

Once the compiler with the embedded CMCSSA application has completed the interprocedural analysis stage, the compiler continues its standard operation of optimizing the source code and translating the source code into an output language (such as machine language) which may be object files (block 220 and 222). Since this stage is standard functionality for a compiler and is well-known to those skilled in the art, no further discussion will be provided.

In the prior art, a scanning-based tool may collect a large volume of data about a computer program. However, much of the data collected may not be relevant in debugging. Unlike the prior art, the CMCSSA application focuses on identifying untrusted data and generating data flows showing the path untrusted data may have traversed across modules in a computer program. Since scanning-based tools usually do not perform cross module analysis and are therefore unable to adequately filter the data collected, most scanning-based tools may inadvertently report a long list of potential problems. With the prior art, reviewers must have a high degree of expertise of programming techniques, of the computer program being created, and of the potential security risks associated with the computer program to properly analyze the long list that may be provided by the scanning-based tools. With data flows provided to track the paths that untrusted data relate to their originating sources, less expertise may be required by embodiments of the invention.

FIGS. 3-11 show further details about the summary collection phase and the interprocedural phase for the CMCSSA application. Consider the situation wherein, a computer program with a plurality of source modules is being analyzed. FIG. 3 shows an example of four different subroutines that will be used as running examples to illustrate the summary collection phase and the interprocedural phase.

Figure 4:
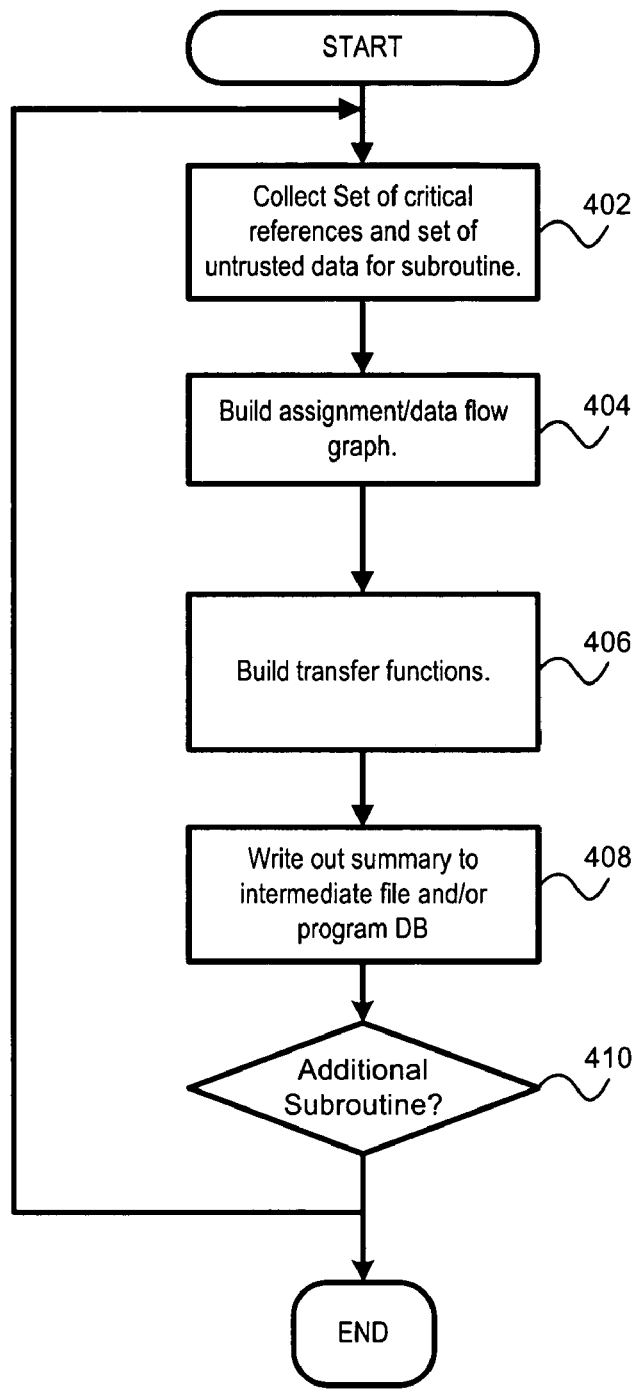
FIG. 4 shows, in an embodiment, a simplified flow chart illustrating the steps taken during the summary collection phase.
Figure 5:
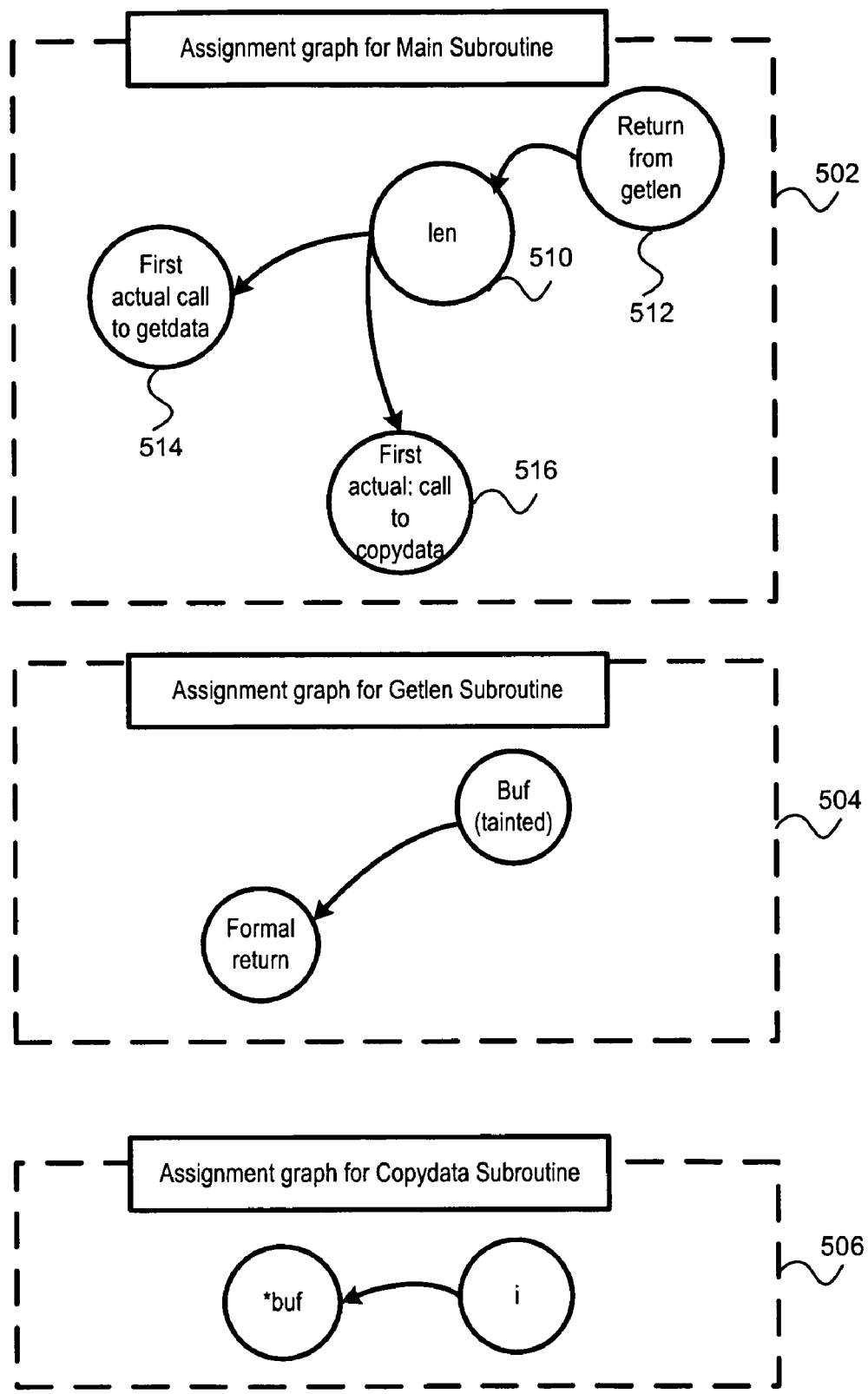
FIG. 5 shows, in an embodiment, examples of assignment graphs.

FIG. 4 shows, in an embodiment, a simplified flow chart illustrating the steps taken during the summary collection phase (See blocks 206 and 208 of FIG. 2). For each source module, the steps are performed for each subroutine until all subroutines have been analyzed. At a first step 402, critical references and untrusted data may be collected for each subroutine. As the terminology is employed herein, a critical reference refers to a code function that is critical to the safe execution of a computer program. Referring back to FIG. 3, examples of critical references may be the variable "len" in line 4 ("recv(1,buf,len,0);//Line 4") of the getdata subroutine and in line 5 ("for (i=o;i<len; i++)//Line 5") of the copydata subroutine.

As discussed herein, untrusted data refers to data that may be provided by an external source. An example of an untrusted data may include data that may be provided by an external end-user. Another example of an untrusted data may be data that may be provided by an external database. Referring back to FIG. 3, examples of untrusted data include the variable "buf" in line 5 of the getlen subroutine and line 4 of the getdata subroutine. Referring back to FIG. 3, examples of critical references may be the variable "len" in line 4 of the getdata subroutine and in line 5 of the copydata subroutine.

The CMCSSA application may include a table defining the critical references and untrusted data that the CMCSSA application may be programmed to search for. In an embodiment, the table may be expandable to enable the end-users to add other types of potential problems. An expandable table may give the end-user the flexibility of configuring the CMCSSA application to accommodate for his specific need. In addition, an expandable table may also be able to accommodate any changes to the standards set by the programming community.

At a next step 404, assignment graphs may be built for each subroutine, in an embodiment. Basically, an assignment graph graphically illustrates the relationship between the various different types of data within a subroutine. See FIG. 5 for examples of assignment graphs (blocks 502, 504, and 506).

The main subroutine in FIG. 3 will be used as an example to illustrate how an assignment graph may be built. The main subroutine has a variable "len" which may receive the value that is returned from a function call to getlen subroutine. Further, the variable "len" may be employed as input value for the two subroutine arguments (i.e., getdata and copydata). With this knowledge, assignment graph may be built for the main subroutine (block 502 of FIG. 5)

Variable node 510 (i.e., len) may be pulling data from return-from-function call node 512 (i.e., return from getlen). In addition variable node 510 may also be the argument value for two callsite-actual nodes 514 and 516 (i.e., first actual call to getdata and first actual call to copydata). Since callsite-actual nodes 514 and 516 are not values for additional arguments, callsite-actual nodes 514 and 516 are examples of leaf nodes. As discussed herein, a leaf node refers to a node in an assignment graph in which the value of the node is not a value for another function call argument.

According to the main subroutine assignment graph, the reachable nodes for callsite-actual node 514 are variable node 510 and return-from-function call node 512. The two same reachable nodes (i.e., 510 and 512) are connected to callsite-actual node 516. As discussed herein, a reachable node refers to a node from which a value of a leaf node may have originated.

Referring back to FIG. 4, once an assignment graph for a subroutine has been built, at a next step 406, one or more transfer functions may be generated. Based off the assignment graph of FIG. 5, two transfer functions may be generated for the main subroutine. As mentioned above, a transfer function refers to a function that defines the relationship between program variables and locations.

FIG. 6 shows, in an embodiment, examples of transfer functions. In an embodiment, a transfer function may show the relationship between a leaf node and a reachable node (i.e., the direct producer of the untrusted data), such as transfer function blocks 602, 604, and 608. In an example, transfer function block 602 (i.e., "getdata_actual_1=getlen_return") shows that the callsite-actual node 514 ultimately receives its value from return-from-function call node 512. In an embodiment, global variables may be included in transfer functions even if global variables may not be a direct producer of the untrusted data. As discussed herein, a global variable refers to a variable that is shared by all procedures.

In another embodiment, a transfer function may indicate the state of a node, such as the transfer functions shown in transfer function blocks 606 and 610. In an example, the transfer function shown in block 606 (i.e., "getlen_formal_return=tainted") indicates that the value for the formal-return node is from an untrusted variable node. Since the variable node is the direct producer of the untrusted data, the transfer function does not show the originating source of the untrusted data. Instead, the transfer function may directly indicate that the node is tainted due to association with a tainted data source.

In another embodiment, a transfer function may also establish binding rules that may be employed across modules. Transfer function blocks 612 and 614 are examples of transfer functions that are defining actual-binding rules. As discussed herein, an actual-binding refers to a relationship between a callsite actual and a formal parameter of a subroutine. In an example, the transfer function for the getdata subroutine in block 612 (i.e., "len=caller_actual_binding") shows that the variable len binds to its caller. Although the transfer function may establish a relationship between the variable len and its caller, the identity of the caller may not be revealed until the various intermediate files are merged in the interprocedural phase.

Referring back to FIG. 4, at a next step 408, the data collected in the summary collection phase for each subroutine may be written to an intermediate file and/or the centralized database for the computer program. At a next step 410, if additional subroutines are available for analysis, steps 402 through steps 408 may be repeated. This iterative process may continue until all subroutines are analyzed.

The steps shown in FIG. 4 illustrate how summary data is collected for each of the subroutines. In the summary collection phase, potential problem sources have been identified. In addition, relationships in the form of transfer functions are established for the potential problems and the various function call arguments. Unlike the prior art, the algorithm in the summary collection phase may focus on collecting data about potential untrusted data and critical references instead of trying to collect a large volume of data that may not be useful in debugging the computer program.

Figure 7:
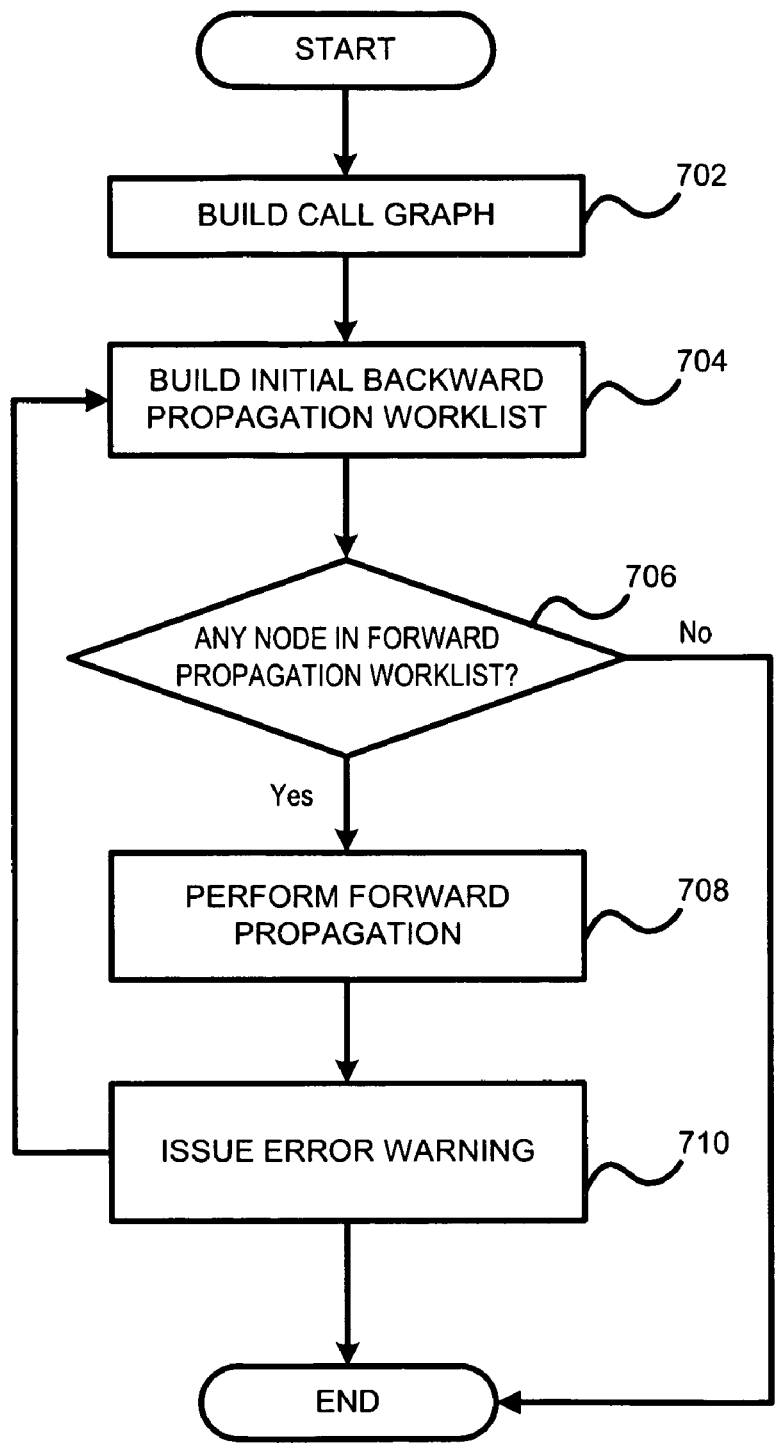
FIG. 7 shows, in an embodiment, a simple algorithm for analyzing data during the interprocedural phase.

FIG. 7 shows, in an embodiment, a simple algorithm for analyzing data during the interprocedural phase. During the interprocedural phase, the compiler may merge the various intermediate files, in an embodiment. At a first step 702, a call graph may be built showing the relationship between the caller (the subroutine that may call another subroutine) and the callee (the subroutine that may be called by another subroutine). See FIG. 8 for an example of a call graph.

Figure 8:
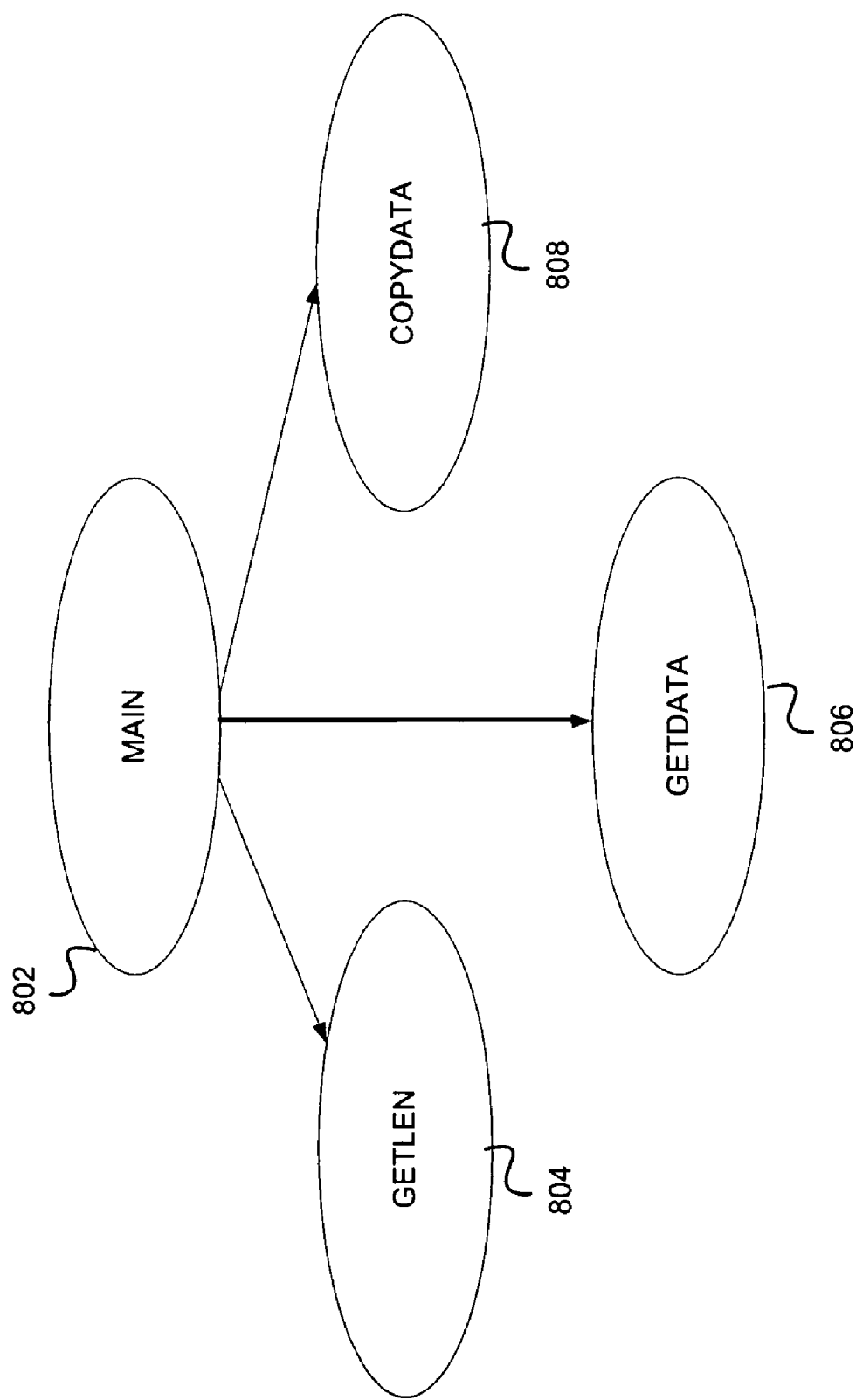
FIG. 8 shows, in an embodiment, an example of a call graph.

Each of the nodes in FIG. 8 represents a subroutine in a computer program. As an example, FIG. 3 has four subroutines. As a result, four nodes (main node 802, getlen node 804, getdata node 806, and copydata node 808) are shown in FIG. 8, with directed edges flowing from main node 802 to getlen node 804, getdata node 806, and copydata node 808. In other words, FIG. 8 shows the main subroutine calling the getlen, the getdata, and the copydata subroutines.

Referring back to FIG. 7, at a next step 704, an initial backward propagation worklist may be created. The initial backward propagation worklist may include subroutine nodes from a call graph that may be a direct producer of untrusted data. In an example, only getlen node 804 and getdata node 806 may populate the initial backward propagation worklist since only these two nodes have been identified during the summary collection phase as direct producers of untrusted data.

Figure 9:
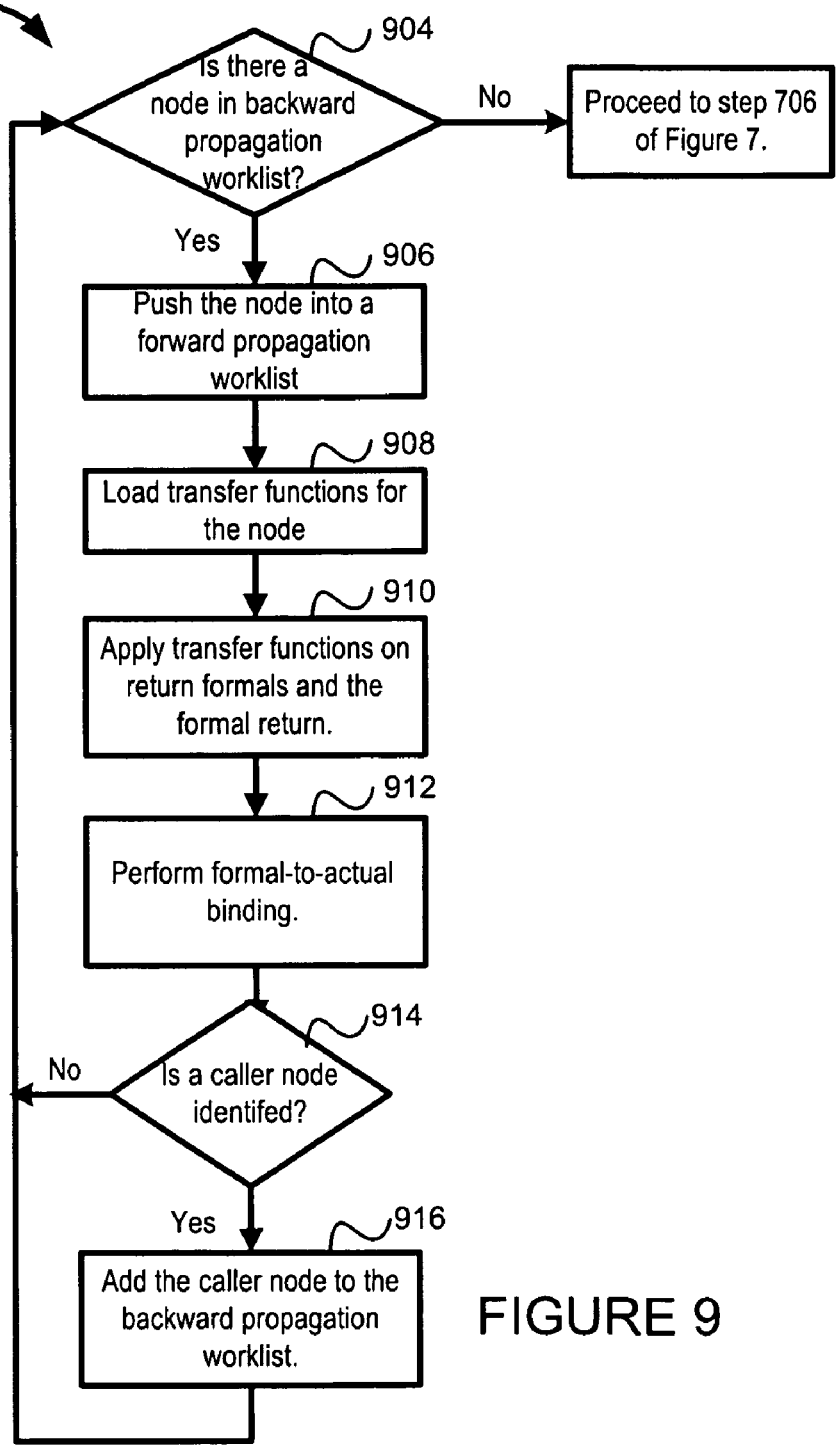
FIG. 9 shows, in an embodiment, a simple flow chart illustrating the backward propagation stage.

At a next step 706, backward propagation may be performed. In performing backward propagation, a data path may be generated illustrating the various subroutines that may have originally received the untrusted data. FIG. 9 shows, in an embodiment, a simple flow chart illustrating the backward propagation stage. At a first step 904, the method may determine if the backward propagation worklist is empty. If the backward propagation worklist is not empty, a subroutine node may be removed from the worklist for analysis. In this example, getlen node is the subroutine node that is first analyzed.

At a next step 906, the subroutine node may be first copied into a forward propagation worklist. By copying the subroutine node into a forward propagation worklist, the method may identify other subroutine nodes that may need to be analyzed to determine if the current subroutine node may have employed the untrusted data in critical references of this subroutine and may have passed the untrusted data to another subroutine (callee).

At a next step 908, the set of transfer functions associated with the current subroutine node may be loaded onto the system. In an example, the current subroutine node that is being analyzed is the getlen node. According to FIG. 6, getlen node has one transfer function, as shown in transfer function block 604 (i.e., "getlen_formal_return=tainted").

At a next step 910, each transfer function may then be merged with the return formals and/or formal return of the current subroutine node. Both return formal and formal return may be employed to pass data back to a caller. The main difference between these two functions is that a formal return may pass a value to the caller whereas the return formal may point to a location. Referring to FIG. 3, the variable "buf" in the getdata subroutine and the copydata subroutine is a return formal in that this variable may point to a location accessible in the main subroutine, which is the main subroutine in this example. The return value of getlen is a formal return For the getlen node, transfer function block 604 is applied to a formal return since no return formal is shown in the getlen subroutine. Since the transfer function for getlen subroutine has already been identified as tainted, no additional analysis has to be performed using the transfer function.

After the transfer function has been analyzed, a formal-to-actual binding may occur at a next step 912. As discussed herein, a formal-to-actual binding refers to mapping a formal return/return formal to a callsite-return (e.g., the function argument that requested the value). Referring back to FIG. 3, the formal return in the getlen subroutine (i.e., "return buf [0]+2") is bound to the callsite return (i.e., return-from-function call node) in the main subroutine. In other words, in the formal-to-actual binding, the caller function may bind to the untrusted data.

At a next step 914, the method determines if a caller node has been identified. If a caller node has been identified, then the caller node may be added to the backward propagation worklist, in a next step 916. In an example, since return-from-getlen is a function of the main subroutine, main node 802 of FIG. 8 is now a caller node and may be added to the backward propagation worklist for analysis.

In an embodiment, if the subroutine node is already in the backward propagation worklist or if the subroutine node has already been analyzed, the subroutine node may not be added to the worklist again. Steps 904 through 916 may iteratively continue until all subroutine nodes in the worklist have been analyzed.

Once the backward propagation worklist is empty, the method may continue to a next step 706 of FIG. 7 to begin the process of forward propagation. At a next step 706 the method may determine if the forward propagation worklist is empty. If the forward propagation worklist is not empty, forward propagation may be performed, at a next step 708. The initial forward propagation worklist may include subroutine nodes that have been in the backward propagation worklist. Referring back to the call graph of FIG. 8, only the main node, the getlen node, and the getdata node are in the initial forward propagation worklist. The copydata node is not included because the copydata node is neither a direct producer of untrusted data nor a caller of direct producer of untrusted data.

Figure 10:
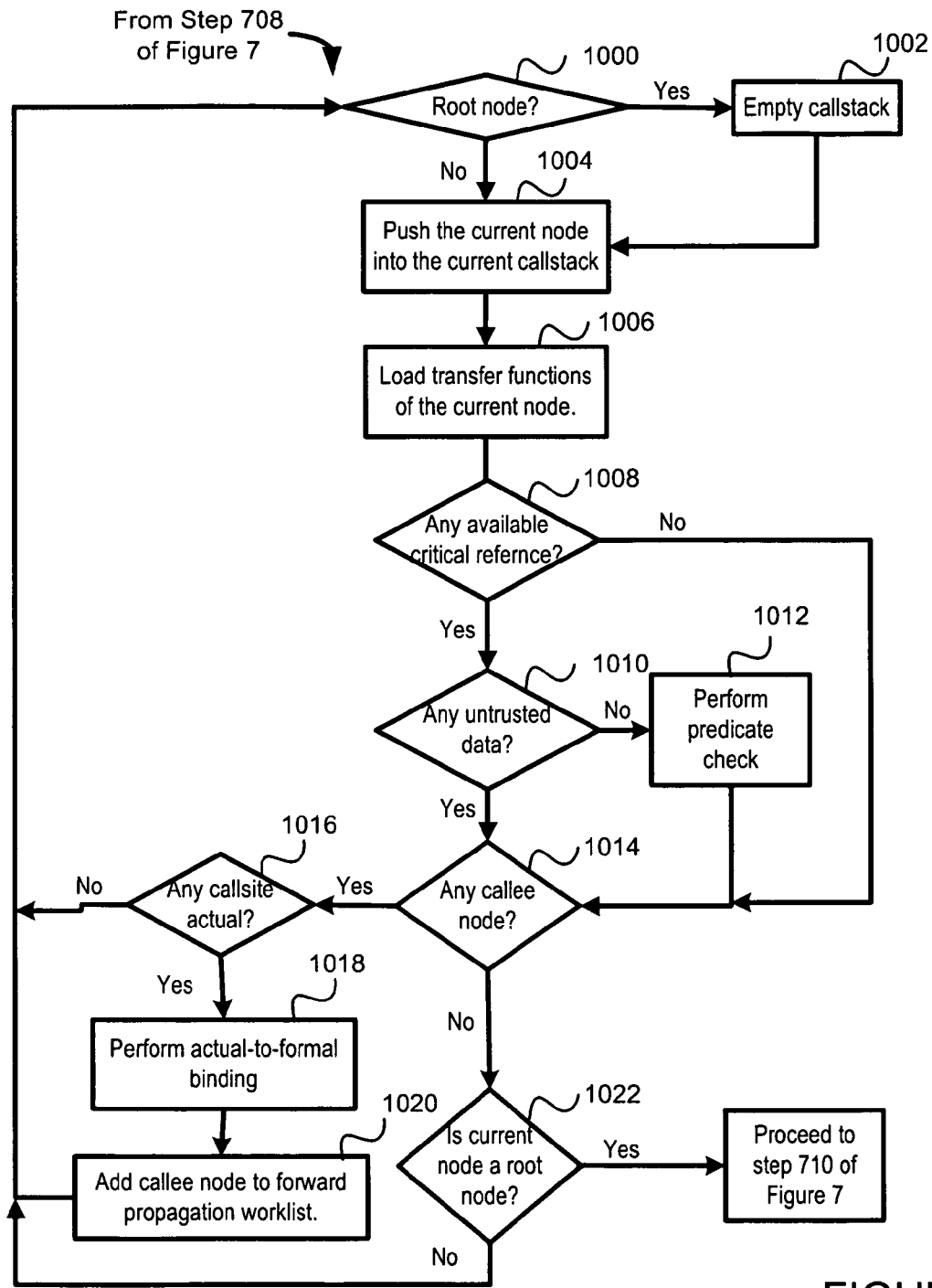
FIG. 10 shows, in an embodiment, a simple flow chart illustrating the forward propagation stage.

In forward propagation, a data path may map the flow of function calls that a subroutine with untrusted data may have traverse. FIG. 10 shows, in an embodiment, a simple flow chart illustrating the forward propagation stage. At a first step 1000, the method may determine if the current subroutine node is a root node. As discussed herein, a root node refers to a subroutine node that may have been included on the original forward propagation worklist. In an example, main node 802 is a root node in the forward propagation worklist whereas copydata node 808 is not.

If at a first step 1000, the current subroutine node is a root node, then the method may proceeds to a next step 1002 to empty the callstack. As discussed herein, a callstack refers to stack which stores information about an active subroutine (e.g., a subroutine which is currently being executed and/or analyzed). Once the callstack has been emptied, the current subroutine node may be pushed onto the callstack, at a next step 1004. If at a first step 1000, the current subroutine node is not a root node, then the method may add the current subroutine node onto the callstack.

At a next step 1006, the set of transfer functions associated with the current subroutine node may be loaded into the system for analysis. In an example, if the current subroutine node is main node 802, then two transfer functions may be loaded onto the system (See FIG. 6).

At a next step 1008, the system may check the intermediate file(s) for the current subroutine to determine if any critical reference is associated with the subroutine node. In an example, the subroutine for main node 802 does not include critical references. Thus, the method may bypass steps 1010 and 1012 to determine if any callee node may be identified.

However, if critical references are available then the method may determine if untrusted data may be associated with the current subroutine, at a next step 1010. If the method determines that untrusted data may be associated with the critical reference(s), then the method may proceed to a next step 1012 to perform the check. In a predicate check, the untrusted data may be analyzed to determine if any guard has been installed. As discussed herein, a guard refers to a method of protecting or checking untrusted data to determine if code has been programmed to prevent or inhibit a third party from exploiting the untrusted data.

At a next step 1014, the method may determine if any callee node exists in the current subroutine node. If no callee node exists, then the method may proceed to step 1000 to perform forward propagation on the next subroutine node. If a callee node exists, then at a next step 1016, the method may determine if a callsite actual may exist between a caller node and a callee node. In an example, getlen node 804 may be a callee node of main node 802. However, upon reviewing assignment graph 502 for the main subroutine, no callsite actual may exist between the main subroutine and the getlen subroutine. Instead, assignment graph 502 only shows two callsite actuals (e.g., "first actual to getdata" and "first actual call to copydata").

At a next step 1018, the method may perform actual-to-formal binding between the caller node and the callee node with a callsite actual (e.g., getdata node 806 and copydata node 808). In other words, an actual-to-formal binding may occur from the callsite actual to the formal return/return formal.

At a next step 1020, the callee node may be added to the forward propagation worklist and the method proceeds to step 1000 to process the callee node as the new subroutine node. In an example, getdata node 806 is moved into the forward propagation worklist and the getdata node 806 is the next subroutine node to have forward propagation performed on it.

Steps 1000 through 1020 may be iteratively continued until all callee nodes in the forward propagation worklist have been processed. If at a next step 1014, no additional callee node is identified, then the method may proceed to a next step 1022. At this step, the method may determine if the current subroutine node is a root or a callee node. If the subroutine node is a callee node, then the method may proceed to a next step 1004 to continue processing. However, if the method determines that the current subroutine node is a root node, then the method may proceed to a next step 710 of FIG. 7.

The algorithm shown in FIG. 10 illustrates how the data collected during the summary collection phase may be employed to perform interprocedural analysis. In the interprocedural phase, potential problems may be analyzed. By performing backward and forward propagation, subroutines which may not have been initially associated with untrusted data in the summary collection phase may be identified.

Referring back to FIG. 7, at a next step 710, a warning may be issued for the current subroutine node. In an embodiment, a static stack trace may be provided with the warning. As discussed herein, a static stack trace may provide information about the origination of the untrusted data, how the untrusted data may have been employed, and the program bug(s) identified. FIG. 11 shows, in an embodiment, examples of static stack traces that may be provided. In an example, box 1100 may include two examples of static stack traces. As shown in the examples, a static stack trace may include information about the subroutine on which the program bug may reside. Also, specifics about the program bug may be presented. Further, function calls that may have called the subroutine with the program bug may be identified. In addition, the original location of the untrusted data may also be identified.

As can be appreciated from embodiments of the invention, the cross module context-sensitive security analysis (CMCSSA) application provides a more comprehensive method of identifying and analyzing program bugs. The CMCSSA analysis produces data pertaining to data paths which a program bug may traverse, thereby providing the programmer with information on the originating source of the program bug. With the utilization of the CMCSSA application, less valuable resources, such as time, man-power and expert knowledge, may be required to locate and fix a program bug within a module and across different modules. As a result, computer programs may be moved into production quicker and with fewer undetected program bugs.

While this invention has been described in terms of several embodiments, there are alterations, permutations, and equivalents, which fall within the scope of this invention. Also, the title, summary, and abstract are provided herein for convenience and should not be used to construe the scope of the claims herein. Further, in this application, a set of intermediate files or a set of any other item refers to one or more items in the set. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A computer-implemented method for detecting program bugs in source code of a computer program that includes a plurality of source modules, each of said plurality of source modules including at least a set of subroutines, comprising:

performing summary collection on subroutines of said plurality of source modules, said performing said summary collection including collecting first data pertaining to at least untrusted data in each of said subroutines of said plurality of source modules, said summary collection including building at least one assignment graph from said first data and building at least one transfer function from said assignment graph;

storing said first data in a set of intermediate files; and performing interprocedural analysis on said set of intermediate files, said interprocedural analysis being configured to identify at least first untrusted data in a given subroutine of said subroutines of said plurality of source modules and to map a data flow tracking said first untrusted data across at least two of said plurality of source modules.

2. The computer-implemented method of claim 1 wherein said first data further pertains to critical references in said each of said subroutines of said plurality of source modules.

3. The computer-implemented method of claim 1 wherein said performing said interprocedural analysis includes building at least one call graph for modeling relationships between subroutines of said plurality of source modules.

4. The computer-implemented method of claim 1 wherein said performing said interprocedural analysis includes performing backward propagation on a given subroutine of said set of subroutines, said given subroutine representing a subroutine that contains at least one untrusted data.

5. The computer-implemented method of claim 1 wherein said performing said interprocedural analysis includes performing forward propagation on a given subroutine of said set of subroutine, said given subroutine representing a subroutine that contains at least one untrusted data.

6. The computer-implemented method of claim 1 further including producing warnings with static stack traces responsive to said performing said interprocedural analysis.

7. The computer-implemented method of claim 1 further including storing said first data in a database for security analysis by another application program.

8. The computer-implemented method of claim 1 wherein at least one of said performing said summary collection and said performing said interprocedural analysis is embedded in a compiler.

9. An article of manufacture comprising a non-transitory tangible computer-readable storage medium encoded with computer-readable program code configured to detect program bugs in source code of a computer program that includes a plurality of source modules, each of said plurality of source modules including at least a set of subroutines, said program code including:

computer readable code for performing summary collection on subroutines of said plurality of source modules, said performing said summary collection including collecting first data pertaining to at least untrusted data in each of said subroutines of said plurality of source modules, said summary collection including building at least one assignment graph from said first data and building at least one transfer function from said assignment graph;
computer readable code for storing said first data in a set of intermediate files; and
computer readable code for performing interprocedural analysis on said set of intermediate files, said interprocedural analysis being configured to identify at least first untrusted data in a given subroutine of said subroutines of said plurality of source modules and to map a data flow tracking said first untrusted data across at least two of said plurality of source modules.

10. The article of manufacture of claim 9 wherein said first data further pertains to critical references in said each of said subroutines of said plurality of source modules.

11. The article of manufacture of claim 9 wherein said computer readable code for performing said interprocedural analysis includes computer readable code for building at least one call graph for modeling relationships between said subroutines of said plurality of source modules.

12. The article of manufacture of claim 9 wherein said computer readable code for performing said interprocedural analysis includes computer readable code for performing backward propagation on a given subroutine of said set of subroutine, said given subroutine representing a subroutine that contains at least one untrusted data.

13. The article of manufacture of claim 9 wherein said computer readable code for performing said interprocedural analysis includes computer readable code for performing forward propagation on a given subroutine of said set of subroutine, said given subroutine representing a subroutine that contains at least one untrusted data.

14. The article of manufacture of claim 9 further including computer readable code for producing warnings with static stack traces responsive to said performing said interprocedural analysis.

15. The article of manufacture of claim 9 further including computer readable code for storing said first data in a database for security analysis by another application program.

16. A computer system comprising:
a processor set including at least one processor; and
non-transitory tangible computer-readable storage media encoded with a compiler configured to, when executed by said processor set,
detect program bugs in source code of a computer program that includes a plurality of source modules, each of said plurality of source modules including at least a set of subroutines,
perform a summary collection including collecting first data pertaining to at least untrusted data in each of said subroutines of said plurality of source modules, said summary collection including building at least one assignment graph from said first data and building at least one transfer function from said assignment graph,
store said first data in a set of intermediate files, and
perform an interprocedural analysis on said set of intermediate files, said interprocedural analysis being configured to identify at least first untrusted data in a given subroutine of said subroutines of said plurality of source modules and to map a data flow tracking said first untrusted data across at least two of said plurality of source modules.

17. The computer system of claim 16 wherein said interprocedural analysis includes performing backward propagation on a given subroutine of said set of subroutine, said given subroutine representing a subroutine that contains at least one untrusted data.

18. The computer system of claim 16 wherein said interprocedural analysis includes performing forward propagation on a given subroutine of said set of subroutine, said given subroutine representing a subroutine that contains at least one untrusted data.

19. A method comprising:
a computer system compiling source code into machine code so as to define program having modules each of which includes one or more subroutines;
during said compiling, said computer system collecting summary subroutine data regarding said subroutines, said summary collecting including
applying criteria for identifying untrusted data and critical references to each of said subroutines so as to identify any untrusted data and any critical references respectively associated with said subroutines, and
for each combination of subroutine and untrusted data, formulating a respective transfer function;
said computer system determining from said summary subroutine data a relation between a critical reference associated with one of said modules and untrusted data having another of said modules as a source.

* * * * *

UNITED STATES PATENT AND TRADEMARK OFFICE
CERTIFICATE OF CORRECTION

| | |
|---|---|
| PATENT NO. | : 7,971,193 B2 |
| APPLICATION NO. | : 11/486552 |
| DATED | : June 28, 2011 |
| INVENTOR(S) | : Xinliang David Li et al. |

Page 1 of 1

It is certified that error appears in the above-identified patent and that said Letters Patent is hereby corrected as shown below:

On the Title page, in field (54), Title, in column 1, line 1,
delete "PERFORMINING" and insert -- PERFORMING --, therefor.

In column 1, line 1, delete "PERFORMINING" and insert -- PERFORMING --, therefor.

Signed and Sealed this
Twenty-seventh Day of March, 2012

David J. Kappos
*Director of the United States Patent and Trademark Office*